United States Patent [19]
deMey et al.

[11] Patent Number: 4,669,324
[45] Date of Patent: Jun. 2, 1987

[54] AROUND-THE-CORNER ADJUSTMENT DEVICE

[75] Inventors: Charles F. deMey, West Redding; Igor E. Dolgen, Monroe, both of Conn.

[73] Assignee: The Perkin-Elmer Corporation, Norwalk, Conn.

[21] Appl. No.: 853,263

[22] Filed: Apr. 17, 1986

[51] Int. Cl.⁴ .................................. F16H 27/02
[52] U.S. Cl. ............................ 74/89.15; 74/110; 403/362; 403/328
[58] Field of Search ............ 403/355, 362, 328; 74/89.15, 110

[56] References Cited

U.S. PATENT DOCUMENTS

| | | |
|---|---|---|
| 46,056 | 1/1865 | Hollands . |
| 1,244,848 | 10/1917 | Gadke ........................ 403/355 |
| 2,588,653 | 3/1982 | Nichols .................... 403/355 X |
| 3,498,651 | 3/1970 | Peterson ................... 403/355 |
| 3,587,335 | 6/1971 | Howland . |

*Primary Examiner*—Andrew V. Kundrat
*Attorney, Agent, or Firm*—Ronald G. Cummings; Francis L. Masselle; Edwin T. Grimes

[57] ABSTRACT

An adjustment device is provided having a block with two longitudinal bores therethrough joined by a slot. A movable member, having a threaded hole therethrough, is slidingly disposed in one bore, and a movable ball and a fixed member, having a curvilinear surface, are disposed in the other. A set screw, having a conical point, is inserted through the slot and screwed through the movable member so that the conical point engages both the fixed member and the movable ball. Further movement of the set screw forces the cone point between the fixed and movable balls, thus causing the movable ball to move away from the fixed ball.

12 Claims, 3 Drawing Figures

4,669,324

AROUND-THE-CORNER ADJUSTMENT DEVICE

FIELD OF THE INVENTION

The present invention relates to devices for precisely adjusting one member relative to another member and, more particularly, to the case where it is desired to make the adjustment in one direction while effecting relative movement of the members in another direction.

BACKGROUND OF THE INVENTION

In complex mechanical assemblies having tight packaging constraints, such as in analytical instruments, it is sometimes necessary to effect the movement of a part in one direction while making the adjustment in another direction. Often, this movement must be accomplished for a number of parts through a single access panel.

In addition to producing output movements at an angle to input, such a device must have low friction and be totally proportional. That is, the output movement must be proportional to the input movement at all times. It is also desirable that such a device be inexpensive.

The present invention accomplishes the above objectives by providing an adjustment device which is inexpensive, has low friction and has an output which is proportional to input.

BRIEF DESCRIPTION OF THE INVENTION

One of the objects of the present invention is to provide a cone-point set screw for use in a differential scheme which cancels out any non-concentricity of the threads and cone typically found in a cone-point set screw.

This is accomplished by providing a block having two longitudinal spaced bores therethrough joined by a slot. A movable member, having a threaded hole therethrough, is slidably disposed in one longitudinal bore. In the other longitudinal bore are a movable ball and a fixed member having a curvilinear surface. A set screw, having a conical point, is inserted through the slot and screwed through the movable member so that the conical point engages both the movable ball and the fixed member having a curvilinear surface. Further movement of the set screw forces the conepoint between the fixed member and the movable ball, which causes the movable ball to move away from the fixed member and against an output member.

Any eccentricity between the cone-point and the set screw is compensated for by longitudinal sliding movement of the movable member.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception on which the disclosure is based may readily be utilized as a basis for designing other structures for carrying out the several purposes of the invention. It is important, therefore, that the claims be regarded as including such equivalent structures as do not depart from the spirit and scope of the invention.

Several embodiments of the invention have been chosen for purposes of illustration and description, and are shown in the accompanying drawings, forming a part of the specification.

DETAILED DESCRIPTION OF A PREFERRED EMBODIMENT

Figure 1:
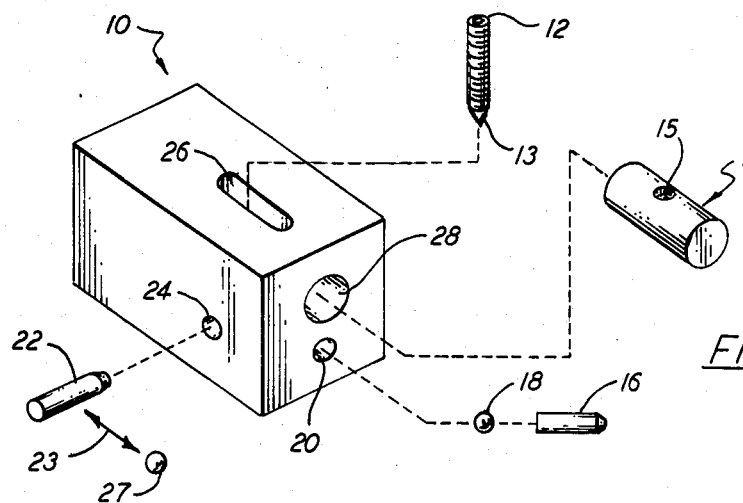
FIG. 1 is an exploded, perspective view of an adjustment device in accordance with the present invention.

FIG. 1 is an exploded view of an adjustment device in accordance with the present invention.

Figure 2:
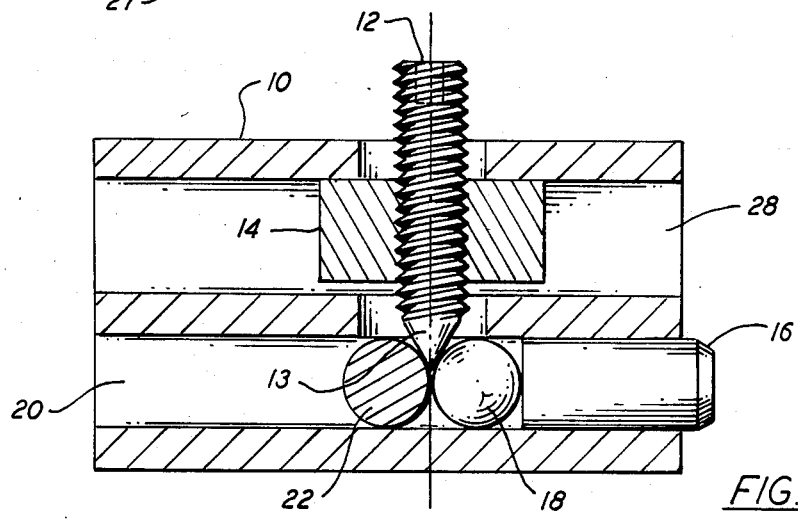
FIG. 2 is a vertical, medial sectional view of the assembled device of FIG. 1.

Two longitudinal bores 20 and 28 are formed in a block 10 and run longitudinally therethrough. The first longitudinal bore 28 is disposed above the second longitudinal bore 20 as shown in FIGS. 1 and 2. A lateral bore 24 is formed in block 10, which is perpendicular to, and intersects, the second longitudinal bore 20.

It should be understood, from the description that follows, that the second longitudinal bore 20 and the lateral bore must be cylindrical to accommodate the ball 18 and pin 22 respectively. The first longitudinal bore 28, however, can be any shape, provided that sliding member 14 is slidingly constrained within it.

A pin 22 is inserted into lateral bore 24 and extends into the second longitudinal bore 20 whereupon its position is fixed. As will become clear as the description proceeds, pin 22 must be inserted into longitudinal bore 20 so as to allow conical point 13 to contact its generally circular external surface. It can be understood by those skilled in the art that pin 22 can be replaced by a ball 27 which is fixed in bore 20 so as to be in a position to be contacted by conical tip 13 in a manner described hereinbelow. This interchangeability is shown, schematically, by a double-headed arrow 23.

Sliding member 14 is slidingly disposed in the first longitudinal bore 28. A hole 15 through the sliding member 14 is internally threaded so as to engage the external threads on set screw 12. Thus, sliding member 14 is inserted into the first longitudinal bore 28 and set screw 12 is threaded therethrough whereupon conical point 13 at the end of set screw 12 engages pin 22. Opposite conical point 13, of set screw 12, from pin 22 is a ball 18 which engages an output member 16.

Output member 16 engages a device, not shown, which device provides a restoring force. This device can be, for example, the part to be moved held against output member 16 by a spring force.

Figure 3:
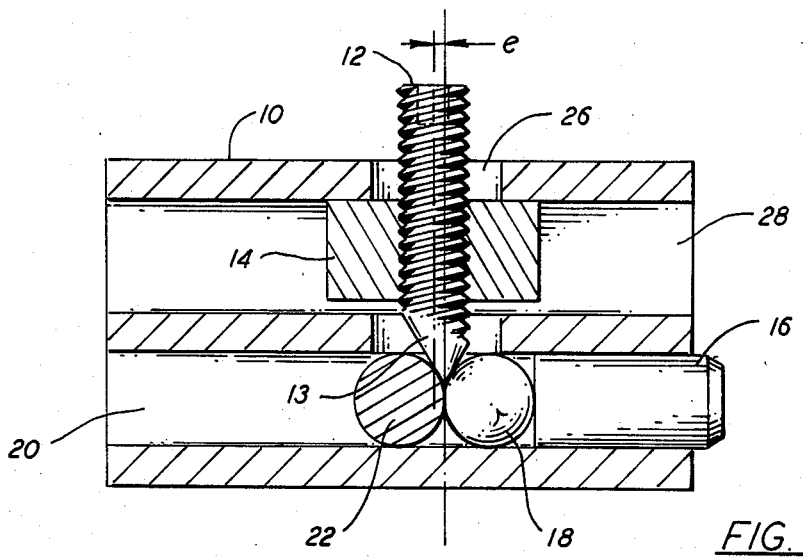
FIG. 3 is a sectional view as in FIG. 2 showing the set screw eccentric with respect to the cone-point.

The operation of the apparatus according to the present invention can now be described. For this purpose reference should be had to FIG. 3 which shows an apparatus, according to the present invention. The set screw 12 shown in FIG. 3 is shown, for the purpose of illustration, as having an exaggerated degree of eccentricity, 'e', about the conical point 13 of set screw 12.

As the set screw 12 is screwed in, that is, into the movable member 14 towards the second longitudinal bore 20, the surface of the conical point engages pin 22 and ball 18. As the set screw 12 continues to be screwed in, ball 18 is forced towards output member 16 and the conical point 13 slides against fixed pin 22. Ball 18 and output member 16 move when the force of the conical point 13 overcomes the restoring force.

The movement of ball 18, and consequently output member 16, is directly proportional to the distance set screw 12 is screwed into movable member 14. The movement of ball 18 is unaffected by the eccentricity, 'e'. Any eccentricity, 'e', that exists between the set screw 12 and the cone point 13 is compensated for by the movable member 14 which is allowed to move longitudinally, in the first longitudinal bore 28. The slot 26 allows the set screw 12 to slide longitudinally while constraining it in a lateral direction.

In this manner the movable member 14 decouples the runout of the threads of the set screw 12 from the conical point 13. This allows the conical point 13 to impart linear movement to the ball 18 and, consequently, output member 16 at right angles to the direction of movement of the set screw 12.

Proper matching of the set screw 12 to the movable member 14 and sizing of moving parts ensures low friction operation.

There has thus been described an adjustment device which has an output proportional, and at substantially right angles, to the input. Further, the apparatus hereinabove described is inexpensive to fabricate, simple to operate and does so with a minimum of frictional losses.

Other modifications of the present invention are possible in light of the above description which should not be deemed as limiting the invention beyond those limitations contained in the claims which follow.

What is claimed is:

1. An adjustment device comprising:
    a set screw having a conical point, slidingly constrained to move in a first direction;
    a movable member, having a hole therethrough threaded to accept said set screw, slidingly constrained to move in the first direction;
    a fixed member having a curvilinear surface fixed in spaced relation to said movable member;
    a movable ball, slidingly constrained to move in the first direction, in spaced relation to said fixed member; and
    said set screw being screwed through said movable member so that said conical point slidingly engages said fixed member and said movable ball.
2. An adjustment device as claimed in claim 1 wherein said movable ball acts against an output member; and
    said output member is slidingly constrained to move in the first direction.
3. An adjustment device as claimed in claim 2 wherein said output member acts against a restoring force.
4. An adjustment device as claimed in claim 2 wherein said movable member is substantially cylindrical.
5. An adjustment device as claimed in claim 1 wherein said fixed member is a ball.
6. An adjustment device as claimed in claim 1 wherein said fixed member is a pin being substantially of a cylindrical shape having a longitudinal axis perpendicular to the first direction.
7. An adjustment device comprising:
    a block having first and second spaced longitudinal bores therethrough;
    said block having a slot therethrough intersecting the first and second longitudinal bores;
    a set screw having a conical point;
    a movable member, having a hole therethrough threaded to accept said set screw, slidingly disposed in the first longitudinal bore;
    a fixed member having a curvilinear surface fixed in said second longitudinal bore;
    a movable ball disposed in said second longitudinal bore adjacent said fixed member; and
    said set screw being inserted through the slot and screwed through said movable member so that said conical point slidingly engages said fixed member and said movable ball.
8. An adjustment device as claimed in claim 7 wherein said movable ball acts against an output member; and
    said output member is slidingly disposed in said second longitudinal bore.
9. An adjustment device as claimed in claim 8 wherein said output member acts against a restoring force.
10. An adjustment device as claimed in claim 8 wherein said first longitudinal bore is substantially cylindrical; and
    said movable member is substantially cylindrical.
11. An adjustment device as claimed in claim 7 wherein said fixed member is a ball.
12. An adjustment device as claimed in claim 7 wherein said block has a transverse bore therein intersecting the second longitudinal bore; and
    said fixed member is a pin fixedly disposed in the transverse bore and extending into the second longitudinal bore.

* * * * *